United States Patent
Pfeilschifter et al.

(10) Patent No.: US 11,161,424 B2
(45) Date of Patent: Nov. 2, 2021

(54) ON-BOARD VEHICLE ELECTRICAL SYSTEM FOR CHARGING AN ELECTRICALLY OPERATED VEHICLE, AND METHOD

(71) Applicant: Vitesco Technologies GmbH, Hannover (DE)

(72) Inventors: Franz Pfeilschifter, Regensburg (DE); Philip Brockerhoff, Regensburg (DE); Martin Brüll, Barbing (DE); Matthias Töns, Regensburg (DE); Edmund Schirmer, Nuremberg (DE); Paul-Markus Schweizer-Berberich, Berlin (DE)

(73) Assignee: Vitesco Technologies GmbH

( * ) Notice: Subject to any disclaimer, the term of this patent is extended or adjusted under 35 U.S.C. 154(b) by 88 days.

(21) Appl. No.: 16/314,913

(22) PCT Filed: Jul. 13, 2017

(86) PCT No.: PCT/EP2017/067677
§ 371 (c)(1),
(2) Date: Jan. 3, 2019

(87) PCT Pub. No.: WO2018/015263
PCT Pub. Date: Jan. 25, 2018

(65) Prior Publication Data
US 2019/0168628 A1    Jun. 6, 2019

(30) Foreign Application Priority Data

Jul. 18, 2016    (DE) .................... 10 2016 213 070.6

(51) Int. Cl.
*B60L 53/24*    (2019.01)
*B60L 50/51*    (2019.01)
(Continued)

(52) U.S. Cl.
CPC ................. *B60L 53/24* (2019.02); *B60L 1/00* (2013.01); *B60L 50/51* (2019.02); *B60L 53/11* (2019.02);
(Continued)

(58) Field of Classification Search
CPC .......... B60L 53/14; B60L 53/24; B60L 53/22; B60L 53/18; B60L 53/56; B60L 2210/14; B60L 2210/12; B60L 2210/42
(Continued)

(56) References Cited

U.S. PATENT DOCUMENTS 5,504,414 A * 4/1996 Kinoshita ............. H02M 7/797
                                                                180/65.8
5,629,603 A * 5/1997 Kinoshita ............... B60L 53/22
                                                                180/65.8
(Continued)

FOREIGN PATENT DOCUMENTS

| DE | 102010027719 A1 | 1/2012 |
| DE | 102016209905 A1 | 12/2016 |
| DE | 102015218416 A1 | 3/2017 |

OTHER PUBLICATIONS

German Examination Report for German Application No. 10 2016 213 070.6, dated Sep. 28, 2016—4 pages.
(Continued)

*Primary Examiner* — David V Henze-Gongola
*Assistant Examiner* — Tarikh Kanem Rankine
(74) *Attorney, Agent, or Firm* — RatnerPrestia

(57) ABSTRACT

A method and a vehicle electrical system having an inverter, an electrical energy store, an electrical machine and an AC transmission terminal. The inverter has first and second sides and is configured to transmit power between these sides. Two output terminals of the inverter are connected or connectable to the energy store on the first side of the
(Continued)

inverter. At least two phase current terminals of the inverter are connected or connectable to the electrical machine on the second side of the inverter. At least one of the charging inputs of the vehicle electrical system is connectable to a respective inner motor phase of the electrical machine by a switching device controlled by a controller. The vehicle electrical system initially charges the electrical energy store with a first voltage, and then charges the electrical energy store with a second voltage, which second voltage is higher than the first voltage.

21 Claims, 7 Drawing Sheets

(51) Int. Cl.
| | |
|---|---|
| *B60L 53/10* | (2019.01) |
| *B60L 1/00* | (2006.01) |
| *H02J 1/00* | (2006.01) |
| *B60L 53/18* | (2019.01) |
| *B60L 53/14* | (2019.01) |
| *B60L 53/34* | (2019.01) |
| *B60L 53/62* | (2019.01) |
| *B60L 53/16* | (2019.01) |
| *H02J 1/08* | (2006.01) |
| *H02J 3/48* | (2006.01) |
| *H02J 7/00* | (2006.01) |
| *B60L 58/20* | (2019.01) |

(52) U.S. Cl.
CPC ............... *B60L 53/14* (2019.02); *B60L 53/16* (2019.02); *B60L 53/18* (2019.02); *B60L 53/34* (2019.02); *B60L 53/62* (2019.02); *H02J 1/00* (2013.01); *B60L 58/20* (2019.02); *B60L 2210/10* (2013.01); *B60L 2210/12* (2013.01); *B60L 2210/14* (2013.01); *B60L 2210/30* (2013.01); *B60L 2210/42* (2013.01); *B60L 2220/54* (2013.01); *H02J 1/082* (2020.01); *H02J 3/48* (2013.01); *H02J 7/0019* (2013.01); *H02J 2207/40* (2020.01); *Y02T 10/70* (2013.01); *Y02T 10/7072* (2013.01); *Y02T 10/72* (2013.01); *Y02T 10/92* (2013.01); *Y02T 90/12* (2013.01); *Y02T 90/14* (2013.01)

(58) Field of Classification Search
USPC ......................................................... 320/109
See application file for complete search history.

(56) References Cited

U.S. PATENT DOCUMENTS

| | | | | |
|---|---|---|---|---|
| 5,642,270 | A * | 6/1997 | Green | B60L 53/12 363/17 |
| 5,929,594 | A * | 7/1999 | Nonobe | H01M 8/04917 320/104 |
| 5,939,802 | A * | 8/1999 | Hornbeck | H02J 1/10 307/87 |
| 6,058,032 | A * | 5/2000 | Yamanaka | H02M 7/49 363/71 |
| 6,128,204 | A * | 10/2000 | Munro | H02J 3/44 318/140 |
| 10,454,290 | B2 * | 10/2019 | Steigerwald | B60L 50/61 |
| 2002/0118556 | A1 * | 8/2002 | Johnson, Jr. | H02M 5/4585 363/123 |
| 2004/0108838 | A1 | 6/2004 | Chen | |
| 2005/0036248 | A1 * | 2/2005 | Klikic | H02M 1/10 361/42 |
| 2005/0213357 | A1 * | 9/2005 | Paatero | H02M 5/458 363/95 |
| 2006/0132085 | A1 * | 6/2006 | Loubeyre | B60L 53/22 320/104 |
| 2008/0094013 | A1 * | 4/2008 | Su | B60L 53/24 318/139 |
| 2009/0078521 | A1 * | 3/2009 | Ohtomo | B60L 53/16 191/12 R |
| 2009/0096410 | A1 * | 4/2009 | Sakurai | B60L 50/51 320/104 |
| 2010/0013438 | A1 * | 1/2010 | Anwar | B60L 53/65 320/138 |
| 2011/0043042 | A1 * | 2/2011 | Klikic | H02M 1/10 307/66 |
| 2011/0169449 | A1 * | 7/2011 | King | B60L 53/14 320/109 |
| 2011/0181236 | A1 * | 7/2011 | Yang | B60L 58/20 320/107 |
| 2012/0007547 | A1 * | 1/2012 | Kim | H02J 7/022 320/107 |
| 2012/0013308 | A1 * | 1/2012 | Briane | H02J 7/14 320/137 |
| 2012/0146592 | A1 * | 6/2012 | Ackermann | H02M 7/125 320/166 |
| 2012/0286720 | A1 * | 11/2012 | Fassnacht | B60L 53/14 320/105 |
| 2012/0299535 | A1 * | 11/2012 | Januschevski | B60L 53/14 320/107 |
| 2013/0069492 | A1 * | 3/2013 | Rippel | B60L 53/24 310/68 D |
| 2013/0234675 | A1 * | 9/2013 | King | H02J 7/02 320/163 |
| 2014/0009113 | A1 * | 1/2014 | Robins | B60L 50/61 320/109 |
| 2014/0021916 | A1 * | 1/2014 | Bilezikjian | B60L 53/14 320/109 |
| 2014/0103713 | A1 * | 4/2014 | Chen | H05K 7/20836 307/23 |
| 2014/0145677 | A1 * | 5/2014 | King | B60L 50/16 320/109 |
| 2014/0217980 | A1 * | 8/2014 | Malrieu | B60L 58/10 320/109 |
| 2014/0346862 | A1 * | 11/2014 | Winkler | B60L 11/1814 307/9.1 |
| 2015/0076914 | A1 * | 3/2015 | Tsai | H02J 9/06 307/66 |
| 2015/0084420 | A1 * | 3/2015 | Dickerson | H02J 9/06 307/29 |
| 2015/0137751 | A1 * | 5/2015 | King | B60L 53/22 320/109 |
| 2015/0137755 | A1 * | 5/2015 | Sadano | H02J 7/0031 320/109 |
| 2015/0274026 | A1 * | 10/2015 | Rippel | H02J 7/045 318/139 |
| 2016/0036250 | A1 * | 2/2016 | Cho | H02J 7/0047 320/112 |
| 2016/0121740 | A1 * | 5/2016 | Zaki | H02J 5/00 320/109 |
| 2016/0144729 | A1 * | 5/2016 | Huang | B60L 53/14 307/10.1 |
| 2016/0368390 | A1 * | 12/2016 | Yang | B60L 11/1818 |
| 2018/0112647 | A1 * | 4/2018 | Abeyasekera | H02J 3/38 |
| 2018/0215268 | A1 | 8/2018 | Pfeilschifter et al. | |
| 2019/0255960 | A1 * | 8/2019 | Tons | H02M 7/5387 |
| 2020/0023746 | A1 * | 1/2020 | Kim | B60L 53/14 |

OTHER PUBLICATIONS

International Search Report and Written Opinion for Application No. PCT/EP2017/067677, dated Dec. 1, 2017—11 pages.

* cited by examiner

ON-BOARD VEHICLE ELECTRICAL SYSTEM FOR CHARGING AN ELECTRICALLY OPERATED VEHICLE, AND METHOD

CROSS REFERENCE TO RELATED APPLICATIONS

This application is the U.S. National Phase Application of PCT International Application No. PCT/EP2017/067677, filed Jul. 13, 2017, which claims priority to German Patent Application No. 10 2016 213 070.6, filed Jul. 18, 2016, the contents of such applications being incorporated by reference herein.

BACKGROUND OF THE INVENTION

Motor vehicles having an electrical drive, i.e. electric vehicles and hybrid vehicles, comprise an electrical energy store for supplying power to the electrical drive. Electric vehicles and plug-in hybrids are equipped with a terminal by means of which DC voltage and/or AC voltage can be used to transmit power from a stationary electrical supply grid (local or public) to the energy store for the purpose of charging the latter.

DE102015218416 and DE102016209905 (the contents of which are hereby part of the disclosure of this application/incorporated by reference), as shown in FIG. 4 and FIG. 5, relate to vehicle electrical systems for charging an energy store of a motor vehicle.

FIG. 3 shows an at least internally known variant of DC charging (DC=DC voltage, AC=AC voltage) for an electric vehicle or plug-in vehicle.

SUMMARY OF THE INVENTION

An aspect of the invention aims to optimize a vehicle electrical system and a method for charging an electrical energy store. This is achieved in each case by the subjects of the independent claims. Further possible configurations of aspects of the invention are obtained from the dependent claims and from this description and the figures, arbitrary combinations of features of one or more of the exemplary embodiments with one another also being able to define independent developments or aspects of inventions.

One advantage of configurations of an aspect of the invention can be that of reducing the charging system costs (e.g. dispensing with charging electronics, switches/contactors and wiring harness) in the vehicle and/or in the infrastructure. One advantage of configurations of aspects of the invention can also be that of further reducing outlay (costs, volume, weight) as a result of dispensing with a second stage of the charging electronics (DC/DC converter), by virtue of the voltage of all HV electrical system components (800 V: energy store/storage battery, inverter, electric motor EM) being chosen such that it is above the level of the rectified system AC voltage. Therefore, according to configurations of aspects of the invention, an AC/DC converter together with onboard filter and offboard system inductances can deal with not only rectification but also voltage matching as well.

BRIEF DESCRIPTION OF THE DRAWINGS

In the drawing, to illustrate some possible configurations of aspects of the invention, in a simplifying manner.

DETAILED DESCRIPTION OF THE PREFERRED EMBODIMENTS

Figure 1:
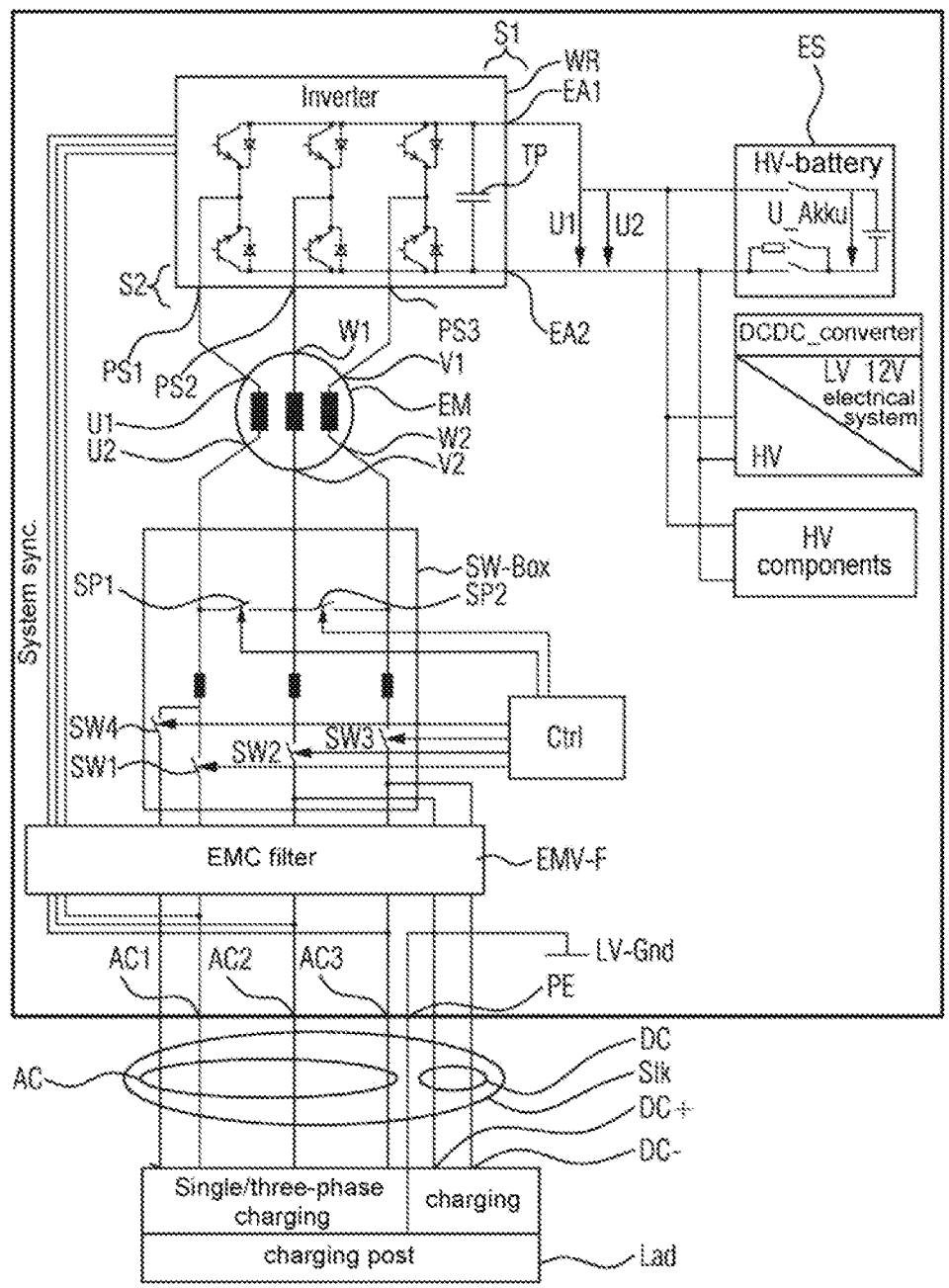
FIG. 1 schematically shows a vehicle electrical system for a motor vehicle or in a motor vehicle in order to use two different voltages and/or successively to charge an energy store initially with single-phase AC and then with polyphase AC or with DC, FIG. 2 schematically shows a further vehicle electrical system for a motor vehicle or in a motor vehicle in order to use two different voltages and/or successively to charge an energy store initially with single-phase AC and then with polyphase AC or with DC, with an additional buck-boost converter to increase a voltage, FIG. 3 schematically shows at least internally known charging of an energy store via a vehicle electrical system with either DC current or AC current, FIG. 4 according to DE102015218416 schematically shows charging of an energy store via a vehicle electrical system with either DC current or AC current, FIG. 5 according to DE102016209905 schematically shows charging of an energy store via a vehicle electrical system with either DC current or AC current, FIG. 6 schematically shows a charging connector for a CAS (combined charging system), and FIG. 7 schematically shows a motor vehicle with a vehicle electrical system.

FIG. 1 schematically shows, in a simplifying manner, as a configuration of an aspect of the invention for charging an energy store ES (such as e.g. a high-voltage/HV battery of a plug-in hybrid/electric motor vehicle Kfz), a vehicle electrical system FBN chargeable with either DC current DC, single-phase AC current AC or three-phase AC current AC by a charging station Lad using a connector Stk, wherein e.g. switches SW1, SW2, SW3, SW4; SP1, SP2 of a switching device SW-Box for charging with first a first voltage U1 and then with a higher voltage U2 are used to raise the battery voltage U_Akku of the energy store ES to be charged to an adequate value (e.g. a voltage value or e.g. x/80% SOC/state of charge of the charging maximum) before charging with the higher voltage U2, in particular if it is discharged at least to below a threshold value (e.g. 20% or 25% SOC/state of charge of the charging maximum).

The depicted vehicle electrical system FBN has a connector Stk (e.g. as shown in FIGS. 1 and/or 6) for charging the energy store ES with DC current DC or (single-phase) AC current AC or three-phase current AC from a charging device Lad (onto which the connector Stk is pluggable).

Figure 6:
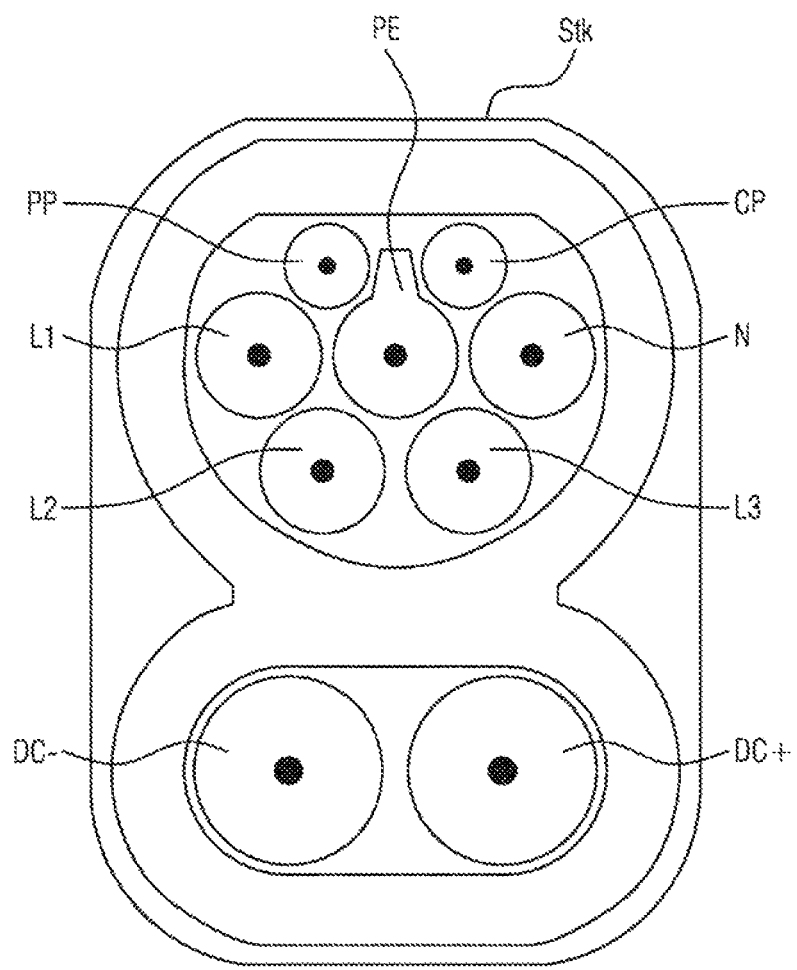
Figure 7:
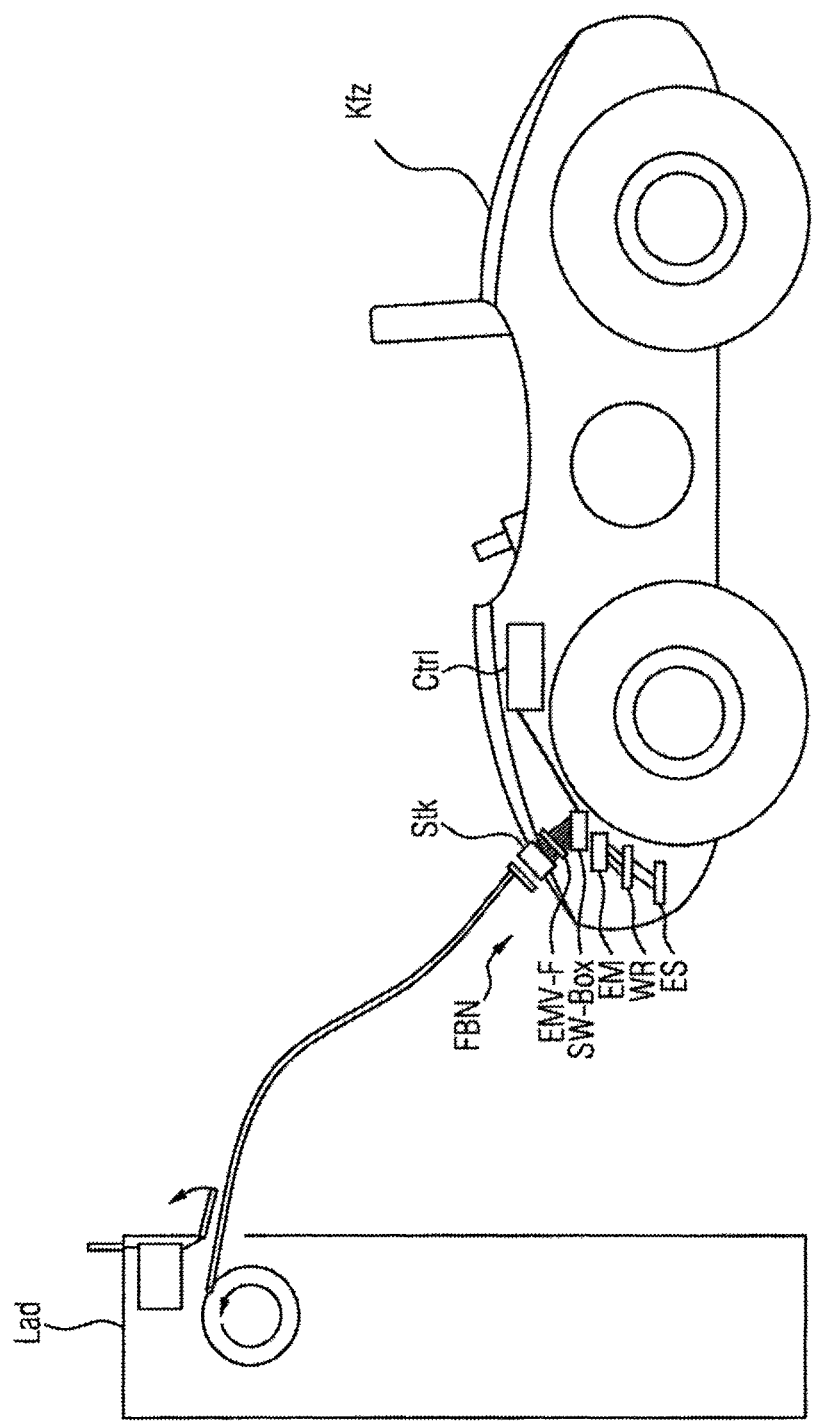

In the example of a connector Stk in FIGS. 1 and 6, e.g. two charging inputs DC+, DC− of a DC transmission terminal DC of the vehicle electrical system FBN for charging the energy store ES with DC current are depicted, and also charging inputs AC1, AC2, AC3, N (, LV-Gnd) (=in FIG. 6 designated as L1, L2, L3, N) of an AC transmission terminal AC of the vehicle electrical system FBN for single-phase AC current AC or three-phase current AC, e.g. in each case for voltages e.g. based on a Chinese or European or German or Japanese or American electrical supply grid standard (e.g. EU/China: 400 V three-phase or EU/China 230 V single-phase or USA/Japan 220 V single-phase), and also e.g. an N conductor (or neutral conductor or ground) N, and if need be control terminals and/or communication terminals (P/CP).

Multiple switching devices (in this case arranged in a switch box SW-Box and/or a housing or module) SW1-SW4 (and SP1, Sp2) controlled by a controller Ctrl are connected to the connector Stk, e.g. via an EMC filter EMV-F.

There is provision for in this case three switching devices SW1-SW3, for connecting either (by means of Ctrl) one or two or three terminals (e.g. AC1 or AC2 or AC3, or AC1 and AC2 and AC3, or DC+ and DC−), at a respective one each of the charging inputs U2, V2, W2 of an electrical machine EM (wherein e.g. two further switching devices SP1, SP2 can be usable for a star delta connection and/or for changing over from a traction mode to a charging mode).

There may be provision for a switching device SW4 for connecting an N conductor. In FIG. 1, the switching device SW4 is connected closer to the connector Stk than an inductance in series therewith that is depicted in FIG. 1.

In FIG. 1, the switching device SW4 is connected further from the connector Stk than a switching device SW1 for a phase AC1.

In FIG. 1, additionally the switching devices SW2 and SW3 are arranged closer to the connector Stk than an inductance (in FIG. 1 above a respective switching device SW2, SW3) between them and the electrical machine EM. The switching devices SW2 and SW3 can alternatively also be arranged further away from the connector Stk than an inductance (in FIG. 1 below a respective depicted inductance in series therewith) or between the electrical machine EM and the inverter SW, however.

As explained in more detail below, e.g. one of the windings (U2 or V2 or W2) of the electrical machine EM is used to charge the energy store ES initially with single-phase AC current (from a terminal AC2 for AC current or three-phase current) or with DC voltage DC (from at least one or both of the terminals DC+, DC− for DC current) at a first voltage U1, TP and then (when the energy store ES is adequately pre-charged) it (ES) is charged with a second, higher voltage U2 (either now with three-phase AC current from AC1 and AC2 and AC3 via U2 and V2 and W2, or from at least one of the terminals DC+, DC− for DC current, via windings U2, V2, W2 (of the stator and/or rotor and/or with a center tap) of the electrical machine EM.

If, as depicted, there is provision for an N conductor terminal N of the connector Stk to be connectable by a switching device SW6, then during charging with the first voltage U1 (with DC voltage or AC voltage) and/or during charging with the second voltage U2 (with DC voltage or AC voltage) this N conductor terminal N can be connected to the electrical machine EM and/or the inverter WR and/or the energy store ES by the charging station Lad by means of the connector Stk and a switching device SW6.

Three phase current terminals PS1, PS2, PS3 on one side S2 of an inverter WR of the electrical machine EM are connected to outputs (of the windings) on one side of the electrical machine EM.

Output terminals EA1, EA2 on the further side S1 of the inverter WR of the energy store ES are connected to charging inputs of the energy store ES and thus initially apply to these a first voltage U1 for pre-charging and (when battery voltage U_Akku and/or state of charge of the energy store ES have reached a prescribed value) then a higher (in comparison with the first voltage) voltage U2 for further charging of the energy store ES.

Figure 2:
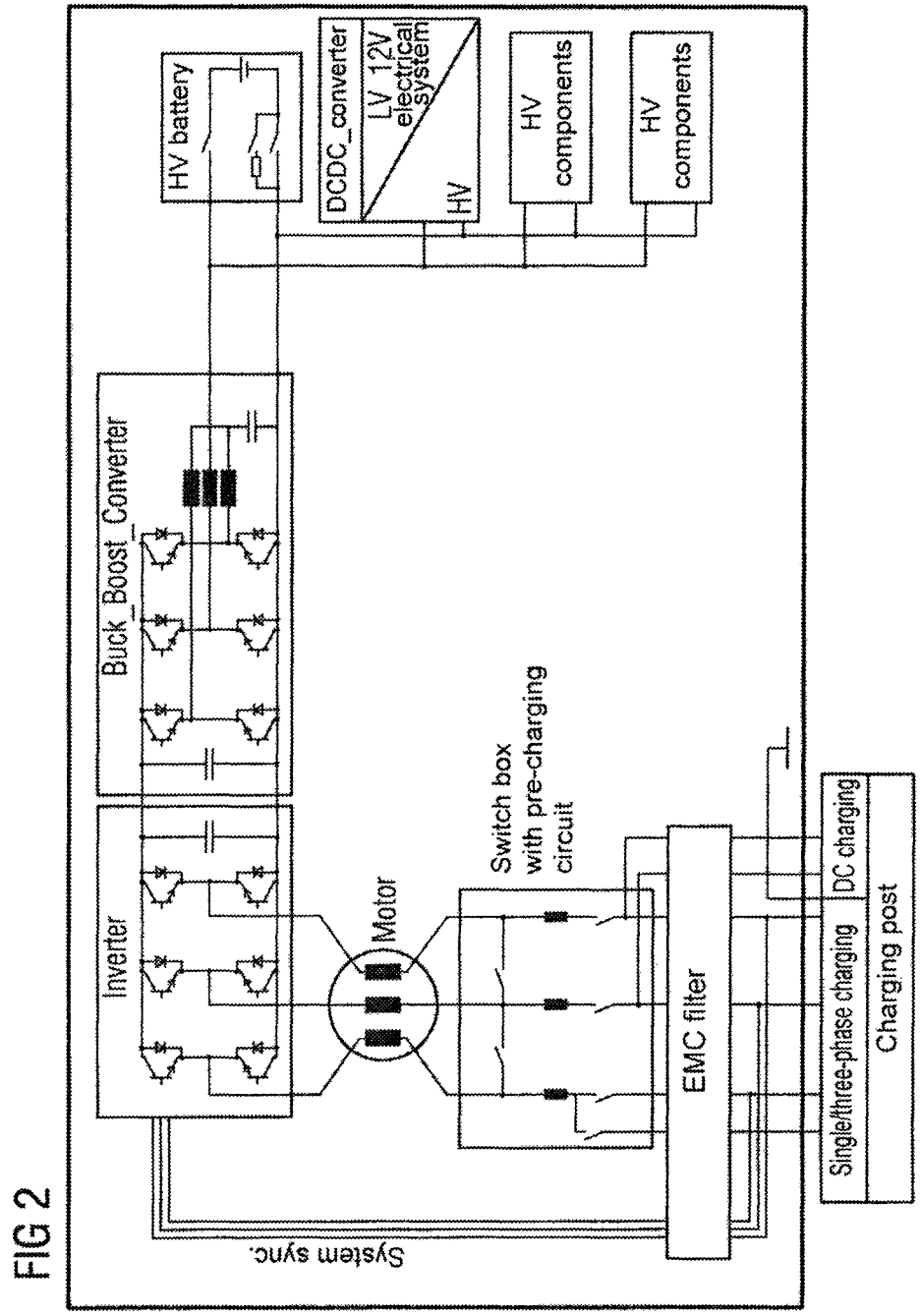
Figure 3:
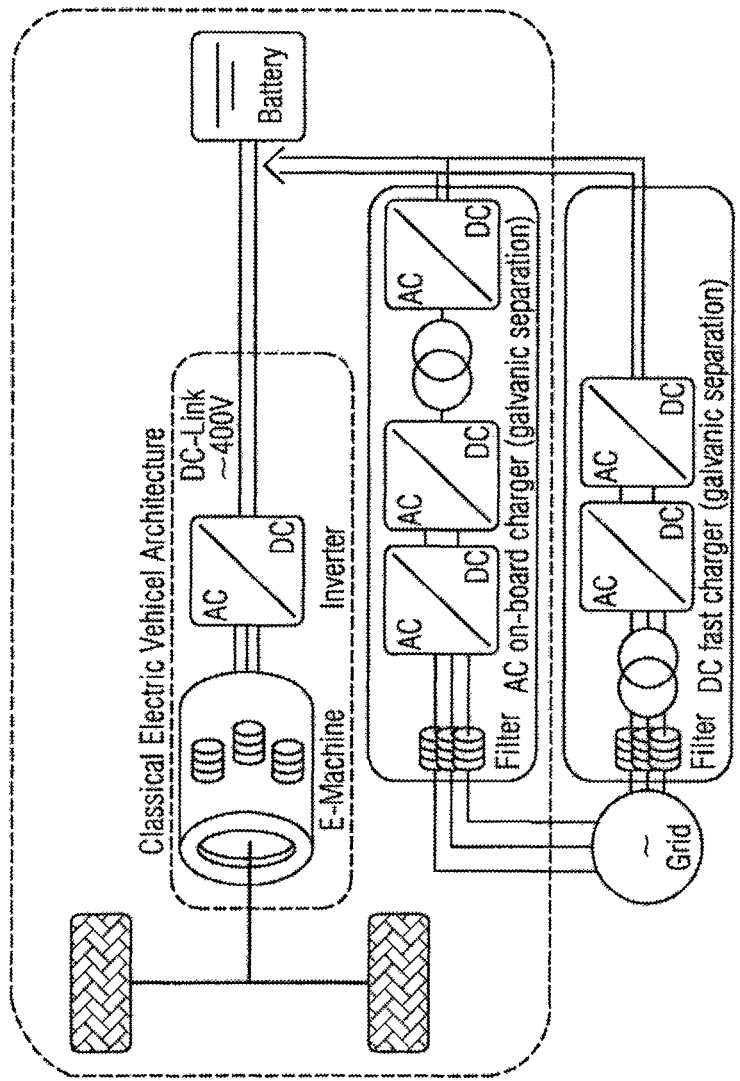

A DC booster such as that denoted by the reference sign "Buck_Boost_Converter" in a configuration of an aspect of the invention in FIG. 2 is not absolutely necessary according to configurations of an aspect of the invention as in FIG. 1 (but would nevertheless be possible as configurations of an aspect of the invention as e.g. in FIG. 2). The electrical machine (e.g. electric motor) EM can in particular operate as a line reactor in the case of single-phase or three-phase AC charging, and rectification of single-phase (AC2 via SW2) and also (e.g. thereafter) three-phase (AC1, AC2, AC3 via SW1, SW2, SW3) AC current AC can be effected via an inverter (e.g. a traction inverter) WR. For the voltage of the vehicle electrical system FBN, a high/higher value of e.g. 800 V can be e.g. continuously chosen (e.g. for the HV electrical system component electrical machine EM (electric motor), the inverter (WR) and the energy store ES (storage battery)).

Figure 4:
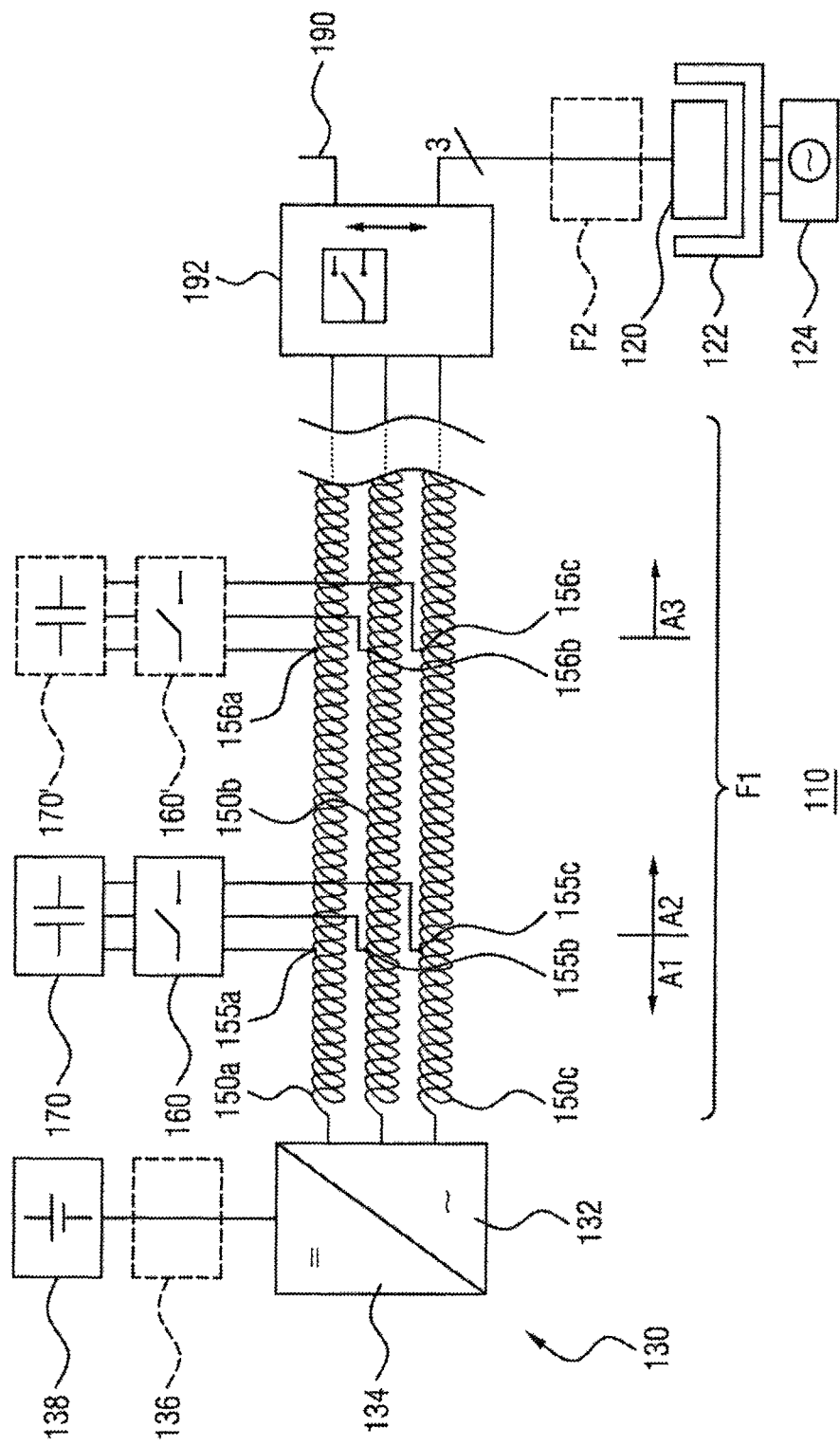
Figure 5:
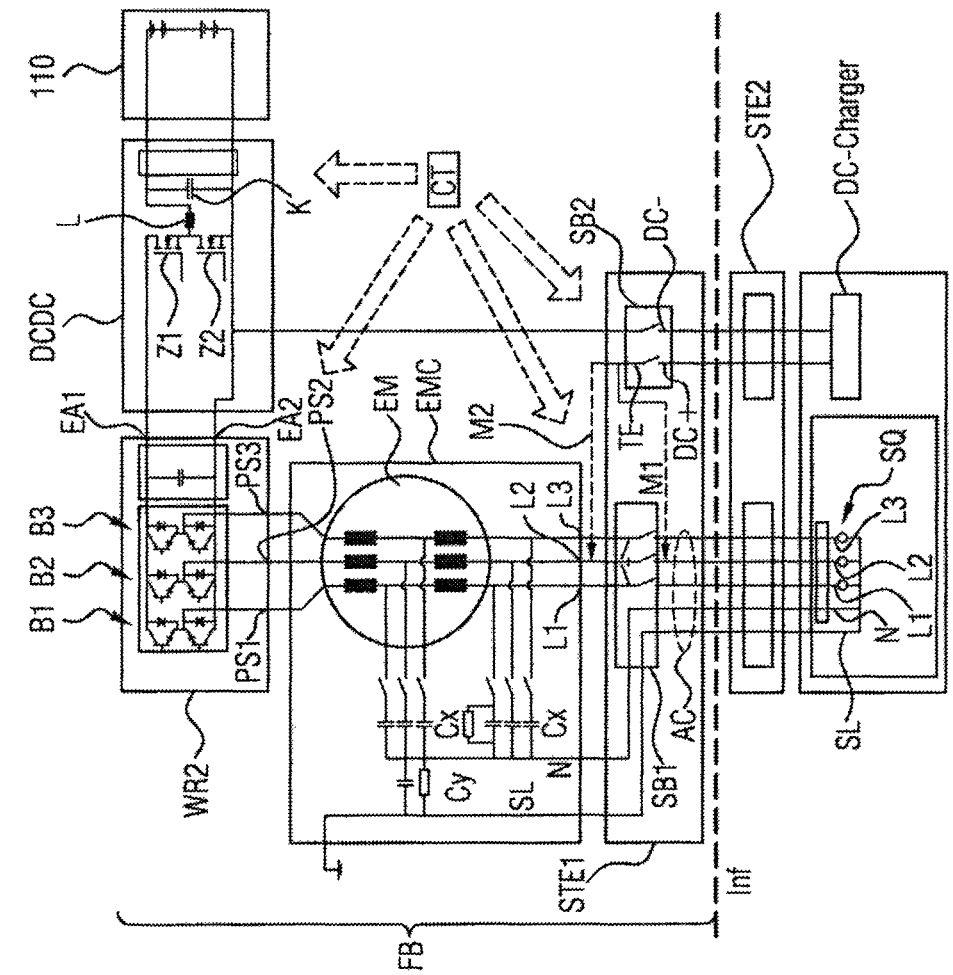

It is possible for the following two measures to be implemented (e.g. instead of DC booster voltage matching described in FIGS. 4 and 5) when charging with AC current (AC) and/or when charging the energy store ES with DC current DC e.g. according to configurations of aspects of the invention:

There can be provision for an energy store (e.g. HV storage battery) ES in the vehicle electrical system FBN (e.g. of a hybrid plug-in/plug-in electric vehicle) EV whose SOC voltage band (SOC: state of charge, or approximately charging status) is partially, in particular "mostly" (e.g. over halfway) above the level of the voltage applied to it (rectified system AC voltage or DC voltage) U1 and/or U2.

It can be expedient, e.g. for use in China or in the EU or Germany, for an energy store (e.g. storage battery) to have a maximum battery voltage and/or charging voltage of 800 V, and a permissible and/or envisaged and/or SOC and/or typical voltage range from empty (e.g. completely or to 20% of the maximum) to full (e.g. completely or to 80% of the maximum) of: 500 to 800 V.

It can be expedient, e.g. for use in the USA or Japan, for an energy store (e.g. storage battery) to have a maximum battery voltage and/or charging voltage of 400 V, and a permissible and/or envisaged and/or SOC and/or typical voltage range from empty (e.g. completely or to 20% of the maximum) to full (e.g. completely or to 80% of the maximum) of: 230 V to 450 V.

If the energy store ES is empty (that is to say e.g. with an SOC and/or state of charge below a limit value of e.g. approximately 20%), e.g. single-phase (by connecting only AC2 via the switching device SW2) slow AC pre-charging (e.g. in China/EU: with min. 230V*1.42*1.1≈360V) is first effected until the battery voltage U_Akku of at least one rectified system AC voltage U_Netz_AVR (of e.g. 400V*1.42*1.1≈600V) is reached, which will from then on be applied as a second voltage U2 for then e.g. three-phase charging (by connecting AC1 and AC2 and AC3 via switching devices SW1 and SW2 and SW3).

A charging sequence according to a configuration of an aspect of the invention can be e.g. the following:

The controller Ctrl, at the beginning of charging of the energy store ES, appropriately switches the switching devices SW1, SW2, SW3, SW4; SP1, SP2 (of which SW1-SW4 are AC system connecting switches in this instance) for slow energy store (ES) pre-charging in order to select the configuration in which the lowest rectified system AC voltage is obtained as U1 on the energy store ES (battery).

(If an inverter were used for the AC system, in the case of which the storage-battery or DC-link voltage is lower than the rectified system AC voltage, a very high uncontrollable charging current could arise via the backward diodes of the inverter semiconductor switches, which charging current can equate to a short-circuit current and could automatically activate a fusible link or weaken components)

If the energy store ES has then been adequately pre-charged, which could be detectable (e.g. also with known characteristic curves) on the basis of the charging voltage and/or charging current profile and/or the voltage U_Akku and/or the charging current into the energy store ES, etc., e.g. because the energy store ES has reached the voltage level of the low or in particular the high rectified AC system voltage (that is to say e.g. U2), then the controller changes over to fast charging (e.g. with U2; and/or: e.g. in the EU/China: with 400 V three-phase, or e.g. USA/Japan: with 220 V single-phase). Changeover takes place e.g. by means of the switching devices SW1-SW6 (that is to say system connecting switches) between a grid (e.g. public, e.g. connected to the charging station Lad) and the phase terminals U2, V2, W2 of the electrical machine EM (e.g. electric motor of a motor vehicle).

According to configurations of aspects of the invention, e.g. two charging inputs DC+, DC− of the DC transmission terminal DC to the outside and/or to a charging station Lad for (at least also) DC voltage DC are connectable to one respective (inner) motor phase (V2, W2) of the electrical machine (EM) each via switching devices SW2, SW3. If a ground terminal LV-Gnd is connectable or connected to the electrical machine EM and/or the inverter WR and/or the energy store ES or ground by the charging station Lad via the connector Stk and a switching device SW6, the connecting (SW2 or SW3) of one of the charging inputs DC+, DC− of the DC transmission terminal DC could also be sufficient for charging, possibly in addition to connecting (SW6) the ground terminal LV-Gnd (the ground terminal could thus also be used as one of the two charging inputs of the DC transmission terminal DC if need be in this case).

E.g. according to configurations of aspects of the invention in the form of connection of a charging station Lad to a public grid in the USA or Japan, the energy store ES can first be pre-charged relatively slowly with e.g. at least 170 V (110V*1.42*1.1≈170V) to at least the level of the "high" (that is to say e.g. D2, which is high in comparison with U1) rectified system AC voltage of approximately 340 V (220V*1.42*1.1≈340V) (e.g. using SW2 or SW3). The charging switches SW1-SW3 between the electrical machine (electric motor) and the AC grid system AC (connected to e.g. terminals AC1 and/or AC2 and/or AC3) are then changed over to the more powerful configuration (e.g. in the USA or Japan from U1=110V single-phase to U2=220V single-phase).

E.g. according to further configurations of aspects of the invention in the form of connection of a charging station Lad to a public grid in China or the EU or Germany, it is possible to change from 230 V single-phase (for charging with initially only the voltage U1) to 400 V three-phase (for charging with then the voltage U2, which is higher in comparison with U1). E.g. the voltage range of 800 V storage batteries can in this instance be e.g. above the level of the rectified system AC voltage (U1 and/or U2) by a much greater margin than would be the case with a 400 V storage battery and the US/Japan grid.

Safety in use can be ensured despite the feature of configurations of aspects of the invention that a DC charging voltage is delivered to a resource that is actually provided for AC operation (such as e.g. the electrical machine ES and/or the inverter WR). The design coverage that the charging system and/or CCS ensures for the AC charging part during DC charging and for the DC charging part during AC charging can avoid e.g. any possible electrical fault situations insofar as AC and DC infrastructure terminals that may be present at the same time would thus not connect voltage to the vehicle electrical system of a vehicle at the same time, but rather would sensibly connect only one of the two, but additional protective devices such as dedicated isolator switches for AC and DC infrastructure terminals in the vehicle electrical system would also be conceivable.

By means of voltages provided, according to configurations of aspects of the invention, for charging the energy store ES at successive times in two stages via windings of the electrical machine EM can also be made available, via a DC-DC converter (reference sign in FIG. 1 "DCDC_converter") provided for this purpose, to a further electrical system of a vehicle (e.g. a further electrical system at 12 V (a vehicle electrical system and/or an electric motor EM on the HV battery and these can be operated e.g. at 48 V during driving, on the other hand).

The invention claimed is:

1. A vehicle electrical system comprising:
   an inverter;
   an electric motor;
   a battery; and
   a charging terminal,
   wherein the inverter has a first side and a second side and is configured to transmit power between these sides,
   wherein two output terminals of the inverter are connected or connectable to the battery on the first side of the inverter,
   wherein at least two phase current terminals of the inverter are connected or connectable to the electric motor on the second side of the inverter,
   wherein at least one of a plurality of charging inputs of the vehicle electrical system is connectable to a respective one of a plurality of motor phases of the electric motor by a switching device controlled by a controller, and
   when at least two phases of the charging inputs of the charging terminal are available to supply respective charging voltages, the vehicle electrical system is designed to:
      initially charge the battery with a first voltage from the charging terminal via only one of the plurality of motor phases, by the switching device connecting only one of the phases of the charging inputs to the only one of the plurality of motor phases, such that the first voltage is supplied to the battery via the only one of the plurality of motor phases and the inverter; and
      then when the battery is determined to be initially charged, charge the battery with a second voltage from the charging terminal via at least two of the plurality of motor phases, by the switching device connecting at least two of the phases of the charging inputs to the at least two of the plurality of motor phases, such that the second voltage is supplied to the battery via the at least two of the plurality of motor phases and the inverter, where the second voltage is greater than the first voltage.

2. The vehicle electrical system as claimed in claim 1, wherein at least one of the plurality of charging inputs of the charging terminal is an AC transmission terminal that is connectable to an inner motor phase of the electrical machine by a controlled switching device to charge with the first voltage,
   and then at least one of the plurality of charging inputs is a DC transmission terminal that is connectable to an inner motor phase of the electrical machine to charge with the second voltage.

3. The vehicle electrical system as claimed in claim 1, wherein the vehicle electrical system is designed so as, when the battery is being charged with DC voltage via at least one input of the transmission terminal of the vehicle electrical system, to connect each switched input to the battery only via one inner motor phase of the electrical machine each.

4. The vehicle electrical system as claimed in claim 1, wherein the switching device has switches for the plurality of charging inputs of the transmission terminal of the vehicle electrical system for a charging device for the vehicle electrical system.

5. The vehicle electrical system as claimed in claim 1, wherein the switching device has one or more switches for one each of the plurality of charging inputs includes a DC transmission terminal of the vehicle electrical system, for connection to a charging device for the vehicle electrical system, for connecting these plurality of charging inputs to one inner motor phase of the electrical machine each.

6. The vehicle electrical system as claimed in claim 1, wherein the switching device has switches connected to the electrical machine for at least one of a star delta connection and shorting phases of the electrical machine to change over from a traction mode to a charging mode.

7. The vehicle electrical system as claimed in claim 1, wherein all the switches of the switching device for at least one of a star delta connection and switches for the plurality of charging inputs, are arranged in at least one of a common housing and module, either between at least one of the electrical machine and an EMC filter in the vehicle electrical system and a connector of the vehicle electrical system or between the electrical machine and the inverter.

8. The vehicle electrical system as claimed in claim 1, wherein a switching device is arranged to connect an N conductor closer to the connector or further from the connector than an inductance in series with it.

9. The vehicle electrical system as claimed in claim 1, wherein a switching device for one phase is connected between a switching device for connecting an N conductor and the connector.

10. The vehicle electrical system as claimed in claim 1, wherein switching devices and for one each of the plurality of charging inputs of the transmission terminal are connected between an inductance in series therewith and the connector.

11. The vehicle electrical system as claimed in claim 1, wherein the plurality of charging inputs include an AC transmission terminal of the vehicle electrical system and the plurality of charging inputs include a DC transmission terminal of the vehicle electrical system are arranged in a connector of the vehicle electrical system, in a connector pluggable into a charging station.

12. The vehicle electrical system as claimed in claim 1, wherein the controller is designed to automatically take the battery state of charge as a basis for deciding whether single-phase or three-phase charging is required.

13. The vehicle electrical system as claimed in claim 1, wherein the controller is designed to automatically take the battery state of charge as a basis for deciding to change over from single-phase to three-phase.

14. The vehicle electrical system as claimed in claim 1, wherein the battery has an voltage band for the permissible charging voltage of the battery, which voltage band is partially or mostly above the level of at least one of the lower and the higher rectified system AC voltage provided for charging when charging via an AC transmission terminal and/or a DC transmission terminal of the vehicle electrical system, a voltage range of from 230 V or 500 V, when the battery is discharged or partially discharged to no more than 20%, to 450 V or 800 V, when the battery is full or at least 80% full, that is to say from 230 V to 450 V or from 500 V to 800 V.

15. The vehicle electrical system as claimed in one claim 1, wherein if the battery is discharged, to a relative limit value of less than approximately 20% or 25% of the maximum, the battery is first charged with at least one of the first voltage and using at least one of a single phase via one phase of the electrical machine and slowly, with a first voltage, which is an AC voltage of at least one of no more than 156 V or 360 V single-phase and until the voltage on the battery is higher than the rectified first or second system AC voltage.

16. The vehicle electrical system as claimed in claim 1, wherein the first voltage on the battery is 230 V and the second voltage on the battery is 400 V, or the first voltage on the battery is 170 V and the second voltage on the battery is 340 V.

17. The vehicle electrical system as claimed in claim 1, wherein the at least one of a plurality of charging inputs is at least one of a single-phase AC transmission terminal and a three-phase transmission terminal.

18. The vehicle electrical system as claimed in claim 1, wherein a switching device is in each case either a mechanical switch, contactor, or a semiconductor switch, or a hybrid switch consisting of a mechanical switch and a semiconductor switch.

19. The vehicle electrical system as claimed in claim 1, wherein both an AC transmission terminal of the vehicle electrical system and a DC transmission terminal are connectable via at least one switching device.

20. The vehicle electrical system as claimed in claim 19, wherein the connector ensures that charging is effected only either via the AC transmission terminal or via the DC transmission terminal.

21. A method for charging a battery, using a vehicle electrical system comprising an inverter, an electric motor, a battery, and a charging terminal, the inverter has a first side and a second side and is configured to transmit power between these sides, two output terminals of the inverter are connected or connectable to the battery on the first side of the inverter, at least two phase current terminals of the inverter are connected or connectable to the electric motor on the second side of the inverter, and at least one of a plurality of charging inputs of the vehicle electrical system is connectable to a respective one of a plurality of motor phases of the electric motor by a switching device controlled by a controller, the method comprising:
when at least two phases of the charging inputs of the charging terminal are available to supply respective charging voltages, the vehicle electrical system is designed to:
initially charging the battery with a first voltage from the charging terminal via only one of the plurality of motor phases, by the switching device connecting only one of the phases of the charging inputs to the only one of the plurality of motor phases, such that the first voltage is supplied to the battery via the only one of the plurality of motor phases and the inverter;
determining when the batter is initially charged; and
when the battery is determined to be initially charged, charging the battery with a second voltage from the charging terminal via at least two of the plurality of motor phases, by the switching device connecting at least two of the phases of the charging inputs to the at least two of the plurality of motor phases, such that the second voltage is supplied to the battery via the at least two of the plurality of motor phases and the inverter, where the second voltage is greater than the first voltage.

* * * * *